United States Patent
Dannrup

(10) Patent No.: US 10,294,651 B2
(45) Date of Patent: May 21, 2019

(54) DEVICE FOR FILTERING STORM WATER

(71) Applicant: BEYOND CLEAN WATER AB, Helsingborg (SE)

(72) Inventor: Niels Dannrup, Helsingborg (SE)

(73) Assignee: BEYOND CLEAN WATER AB, Helsingborg (SE)

( * ) Notice: Subject to any disclaimer, the term of this patent is extended or adjusted under 35 U.S.C. 154(b) by 0 days.

(21) Appl. No.: 15/515,753

(22) PCT Filed: Sep. 30, 2015

(86) PCT No.: PCT/EP2015/072537
§ 371 (c)(1),
(2) Date: Mar. 30, 2017

(87) PCT Pub. No.: WO2016/050833
PCT Pub. Date: Apr. 7, 2016

(65) Prior Publication Data
US 2017/0241123 A1   Aug. 24, 2017

(30) Foreign Application Priority Data

Sep. 30, 2014  (SE) .................................... 1451159-6

(51) Int. Cl.
*E03F 5/04*  (2006.01)
*E03F 5/14*  (2006.01)
(Continued)

(52) U.S. Cl.
CPC ............ *E03F 5/0404* (2013.01); *B01D 35/05* (2013.01); *B01D 35/143* (2013.01); *B01J 20/02* (2013.01);
(Continued)

(58) Field of Classification Search
CPC ......... E03F 5/04; E03F 5/0401; E03F 5/0404; E03F 5/041; E03F 5/14; B01D 35/05;
(Continued)

(56) References Cited

U.S. PATENT DOCUMENTS 717,932 A  *  1/1903  Scudder ................. B01D 35/05
                                                          210/242.1
1,647,809 A  *  11/1927  Neumann .............. B01D 35/05
                                                          210/242.1
(Continued)

FOREIGN PATENT DOCUMENTS

| | | |
|---|---|---|
| EP | 2 620 561 A1 | 7/2013 |
| KR | 10-2008-0056980 A | 6/2008 |
| SE | 9801084 L | 10/1999 |

OTHER PUBLICATIONS

International Search Report and Written Opinion dated Jan. 19, 2016, issued in corresponding International Application No. PCT/EP2015/072537, filed Sep. 30, 2015, 9 pages.

*Primary Examiner* — Christopher Upton
(74) *Attorney, Agent, or Firm* — Christensen O'Connor Johnson Kindness PLLC

(57) ABSTRACT

The present invention relates to a device (1) for filtering storm water inside a storm drain. The device (1) comprises a filter unit (2), a metal capturing ballast unit (6), and a floating carrier (4) for carrying the filter unit and the metal capturing ballast unit (6). Whereby, in use, the device (1) is arranged in a floating condition in the storm water of the storm drain. The filter unit (2) is at least partially arranged above a surface (5) of the storm water, and the metal capturing ballast unit (6) is arranged below the surface (5) of the storm water. The metal capturing ballast unit (6) comprises a solid material for capturing metal and providing ballast.

11 Claims, 2 Drawing Sheets

(51) Int. Cl.

| | |
|---|---|
| *B01D 35/05* | (2006.01) |
| *B01D 35/143* | (2006.01) |
| *B01J 20/02* | (2006.01) |
| *B01J 20/20* | (2006.01) |
| *B01J 20/26* | (2006.01) |
| *C02F 1/00* | (2006.01) |
| *C02F 1/28* | (2006.01) |
| *C02F 1/40* | (2006.01) |
| *C02F 101/20* | (2006.01) |
| *C02F 101/32* | (2006.01) |
| *C02F 103/00* | (2006.01) |

(52) U.S. Cl.
CPC ............ *B01J 20/20* (2013.01); *B01J 20/261* (2013.01); *C02F 1/001* (2013.01); *C02F 1/281* (2013.01); *C02F 1/283* (2013.01); *C02F 1/285* (2013.01); *C02F 1/40* (2013.01); *E03F 5/041* (2013.01); *E03F 5/14* (2013.01); *C02F 2101/20* (2013.01); *C02F 2101/32* (2013.01); *C02F 2103/001* (2013.01)

(58) Field of Classification Search
CPC .......... C02F 1/281; C02F 1/283; C02F 1/285; C02F 1/40; C02F 2103/001
USPC ......... 210/122, 170.03, 170.05, 242.1, 747.3
See application file for complete search history.

(56) References Cited

U.S. PATENT DOCUMENTS

| | | | | |
|---|---|---|---|---|
| 5,820,762 | A * | 10/1998 | Barner | E03F 5/0404 210/163 |
| 6,099,723 | A * | 8/2000 | Morris | E03F 5/0404 210/170.03 |
| 6,337,025 | B1 * | 1/2002 | Clemenson | B01J 20/22 210/170.03 |
| 6,368,499 | B1 * | 4/2002 | Sharpless | E03F 5/0404 210/164 |
| 6,767,456 | B2 * | 7/2004 | Middleton | E03F 5/0404 210/170.03 |
| 8,034,234 | B2 * | 10/2011 | Happel | E03F 5/14 210/170.03 |
| 2005/0218049 | A1 | 10/2005 | Happel | |
| 2008/0164223 | A1 * | 7/2008 | Wilson | C02F 1/003 210/242.1 |
| 2010/0065488 | A1 * | 3/2010 | Milne | B01D 35/05 210/242.1 |
| 2014/0027362 | A1 | 1/2014 | Kent | |

* cited by examiner

DEVICE FOR FILTERING STORM WATER

TECHNICAL FIELD

The present invention relates to a device for filtering storm water inside a storm drain to remove pollutants or contaminants from it. More specifically the present invention relates to a floating device for filtering storm water, which when in use, inside a storm drain may be arranged in a floating condition in the storm water of the storm drain.

BACKGROUND ART

Storm water, which also is called urban runoff, is surface runoff of rainwater, melted snow or ice, wash water or similar from different types of surfaces. Such surfaces can be parking lots, sidewalks, roofs, and similar surfaces, sometimes referred to as impervious surfaces. Water running off from such surfaces tends to become polluted by e.g. gasoline, oil, heavy metals, trash, fertilizers, pesticides and other pollutants. During rain these surfaces carry polluted storm water to storm drains. Storm drains can be connected to a drainage system for discharge into receiving surface waters, such as a canal, river, lake, reservoir, sea, ocean, or other surface water, with or without treatment of the storm water before discharge.

Storm drains generally comprise a vertical pipe having an inlet, such as a horizontal grated inlet or a side inlet, being connected to a drainage system. Such storm drains commonly comprise a catch basin, also called sump or gully-pot, for catching small objects, such as sediment, sand, gravel, pebbles, twigs, trash and similar. Then, the catch basin serves as a water-filled trap for trapping objects and prevents such objects from entering the subsequent drainage system. Such catch basins also prevent gases from the drainage system from escaping out into the open air. Storm water from the top of the catch basin drains into the subsequent drainage system. The catch basins can be emptied by means of vacuum trucks at suitable time intervals in order to prevent clogging of the drainage system.

There are different types of devices for filtering storm water disclosed in the prior art. Such prior art devices commonly comprise a filter for positioning in an inlet of a storm drain. Commonly the filter unit is fixedly mounted or attached to the inlet of the storm drain in question. This approach results in a troublesome and time consuming installation process. Also the removal of the filter may be troublesome and time consuming. Moreover, the installation of a filter may reduce the capacity of the storm drain concerned.

EP 2 620 561 A1 discloses a floating filter device for filtering storm water inside a storm drain. The disclosed filter device uses various materials for removing pollutants or contaminants from the storm water being filtered. The disclosed device may suffer from stability problems when e.g. being subjected to large flows of storm water.

Hence, there is a need for an improved device for filtering storm water inside a storm drain.

SUMMARY OF THE INVENTION

It is an object of the present invention to provide an improvement of the above techniques and prior art.

A particular object is to provide device for filtering storm water inside a storm drain. This and other objects as well as advantages that will be apparent from the following description of the present invention are achieved by a device for filtering storm water inside a storm drain according to the independent claim. Preferred embodiments are defined in the dependent claims.

Hence a device for filtering storm water inside a storm drain is provided, wherein the device comprises a filter unit, a metal capturing ballast unit, and a floating carrier for carrying the filter unit and the metal capturing ballast unit, whereby, in use, the device is arranged in a floating condition in the storm water of the storm drain, the filter unit is at least partially arranged above a surface of the storm water, and the metal capturing ballast unit is arranged below the surface of the storm water, wherein the metal capturing ballast unit comprises a solid material for capturing metal and providing ballast.

By means of the present invention it is possible to provide an improved device for filtering storm water inside a storm drain by providing a metal capturing ballast unit in the device. The use of a metal capturing ballast unit brings about that the device experiences an increased stability as the ballast unit counteracts any tilting momentum exerted to the device from e.g. large flows of storm water reaching the device during heavy rainfall or from objects impinging on or building up on the device. Moreover, the use of a metal capturing ballast brings about that the storm water present in the storm drain will contact the metal capturing ballast when the device is floating in the storm drain. This brings about that metals present in the storm water of the storm drain may come into contact with the metal capturing ballast and hence be captured, resulting in that the metal is removed from the storm water of the storm drain.

Hence, the present invention is based on the realisation that the use of a metal capturing ballast unit may improve the stability of the device and at the same time remove metal form the storm water in which the device is floating during use.

The solid material of the metal capturing ballast unit may comprise slag from production of raw iron by means of a blast furnace. The use of slag from production of raw iron brings about that an efficient metal capturing is provided and at the same time ballasting of the device is provided. Moreover, the use of slag implies that the availability of the material is good and the price is favourable.

The solid material of the metal capturing ballast unit may be produced by cooling the slag by means of fresh water, which is advantageous in that a porous material having an increased contact surface may be provided, resulting in that the efficiency of capturing metal is improved.

The solid material of the metal capturing ballast unit may be a solid granular material, which is advantageous in that the handling of the material is simplified as the material may easily be loaded in the device.

The filter unit of the device may comprise a material selected from the group consisting of porous polypropylene, slag from production of raw iron, and activated carbon, which is advantageous in that an efficient filter unit may be provided.

The metal capturing ballast unit of the device may further comprise activated carbon, which is advantageous in that further pollutants or contaminants may be removed from the storm water of the storm drain.

The metal being captured may be selected from the group consisting of atomic metal, ionic metal, or compounds comprising metal, which is advantageous in that metal may be captured in various forms.

The metal being captured may be a heavy metal, which is advantageous in that toxic metals may be captured.

The device may further comprise a sheet of porous polypropylene extending radially outside the device and being at least partially arranged at the surface of the storm water, which is advantageous in that pollutants and contaminants, such as oil, present on at the surface of the storm water in the storm drain may be removed or captured.

The device may further comprise a compartment arranged below the surface of the storm water, wherein the compartment may be provided with porous polypropylene, which is advantageous in that further pollutants or contaminants may be captured or removed from the storm water of the storm drain.

As indicated above, the solid material of the metal capturing ballast unit may comprise slag from production of raw iron by means of a blast furnace. Slag of the present type is available under the trade name of "Hyttsand" from SSAB Merox AB, Oxelösund, Sweden. In the following description, the wording hyttsand will be used when exemplifying slag of the present type used in embodiments of the present invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF DRAWINGS

Aspects of the invention will be described in more detail below, with reference to drawings illustrating embodiments of the invention

DETAILED DESCRIPTION

The following detailed descriptions of embodiments of the invention are included as examples to improve the understanding of the invention and should not in any way be interpreted as limiting the scope of the invention.

Figure 1:
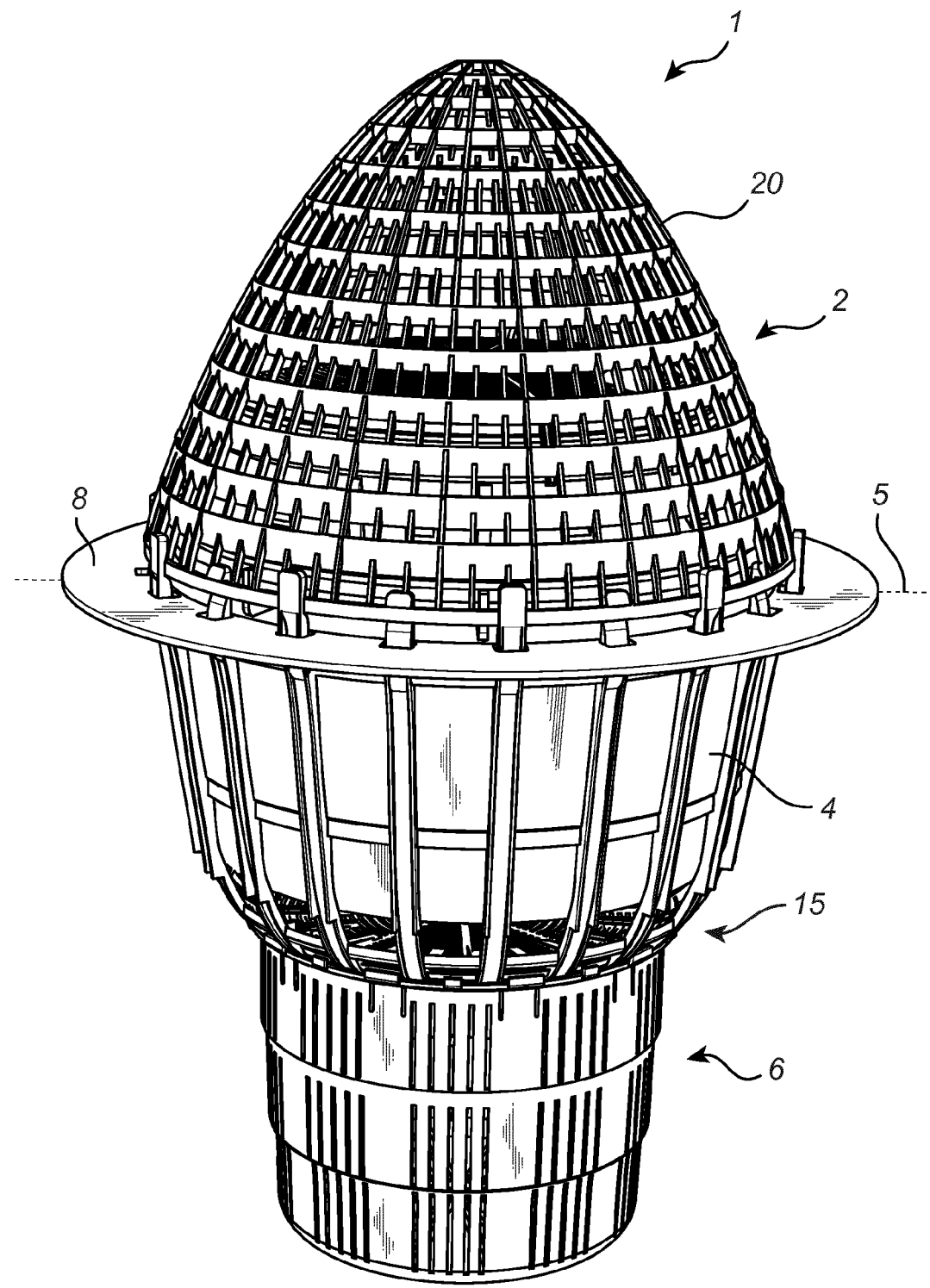
FIG. 1 illustrates a device for filtering stormwater according to an embodiment of the present invention.

FIG. 1 illustrates a device 1 for filtering storm water. The device 1 may typically be used inside a storm drain, such as for example a storm drain of a road or street or in the vicinity of a road or a street, for filtering of stormwater and capturing of compounds and particles present in the stormwater. The device 1 is arranged to form a gap between the device 1 and an interior wall of the stormdrain. The gap is arranged so that objects, such as sediment, sand, gravel, pebbles, twigs, trash and similar can pass by the device 1 to a catchbasin of the storm drain. Hence, the device 1 is arranged to cover less than 100% of the cross section area of the stormdrain, such as, for example, 50-90%.

Parts for the filter unit 2, the floating carrier 4 and the metal capturing ballast unit 6 may be made of, for example, injection moulded plastic material.

For the purpose of filtering storm water, the device 1 has a filter unit 2 for filtering of storm water and removal of contaminants, carried by a floating carrier 4. The floating carrier according to this example is an air filled plastic container, but it is realised that other suitable materials and devices may be used, such as, for example, a body of foamed plastic. A ballast unit 6 provides ballast to the device 1 and further comprises a solid material for capturing metal from the storm water. When used in a storm drain (the storm drain is not illustrated), the device 1 is arranged such that it floats in the storm water with a surface of the storm water typically in the area of dotted line 5. The ballast unit 6 may prevent the device from turning over, such as if hit by gravel or rocks falling into the storm drain, or hit by heavy flows of storm water.

Storm water entering the storm drain will, at least in part, contact the filter unit 2, whereby storm water will pass through the filter unit 2. In this embodiment, the filter unit 2 comprises a cover 20 arranged to efficiently allow storm water to enter the filter unit 2 while larger particles and objects, such as gravel, rocks, or branches may bounce off the cover 20 and fall into to the bulk of the storm water in the storm drain. For the purpose of cleaning the storm water by removal of pollutions or contaminants, filter unit 2 may comprise a material selected from porous polypropylene, slag from production of raw iron, and activated carbon, or combinations thereof. Thus, contaminants in the storm water may be captured, adsorbed or absorbed to the material and, thus, removed from the storm water. As one result, storm water with decreased levels of contaminants may leave the filter unit 2 and enter the storm drain. It is realised that the storm water inside the storm drain may comprise contaminants, such as, for example, metals, such as heavy metals, organic compounds, and inorganic compounds, metal-organic compounds, or combinations thereof, as a result of the storm water entering the storm drain comprises these compounds, and as the result of at least parts of these compounds not being trapped by the filter unit 2. For the purpose of further cleaning the storm water in the storm drain by removal or capturing of contaminants, the ballast unit 6 comprises a solid material, which may be, for example, slag from production of raw iron by means of a blast furnace (not illustrated), such as hyttsand. Such material results in efficient capturing of metals from the storm water. Thus, the hyttsand not only results in efficient cleaning of storm water by removal of metals such as heavy metals, but also provides ballast to the device. Hyttsand is, thus, very efficient as it may provide both efficient removal of contaminants, and provides weight suitable for providing ballast to the device 1.

In addition to any cleaning of the storm water by the filter unit and the solid material in the ballast unit 6, the device may be provided with a sheet of porous polypropylene 8, at least partially arranged at the surface of the storm water. The sheet of porous polypropylene 8 may, thus, be particularly efficient in removing contaminants present at the surface of the storm water, for example oil, grease or other floating contaminants. Such floating contaminants may also be removed by means of the filter unit 2 as it may be arranged in contact with the surface of the storm water. Porous polypropylene may be an efficient material for removal of oil and grease from the storm water.

Further, the illustrated embodiment comprises a compartment 15 arranged below the surface of the storm water and provided with porous polypropylene, and thus contaminants present below the surface may be removed by means of porous polypropylene.

Figure 2:
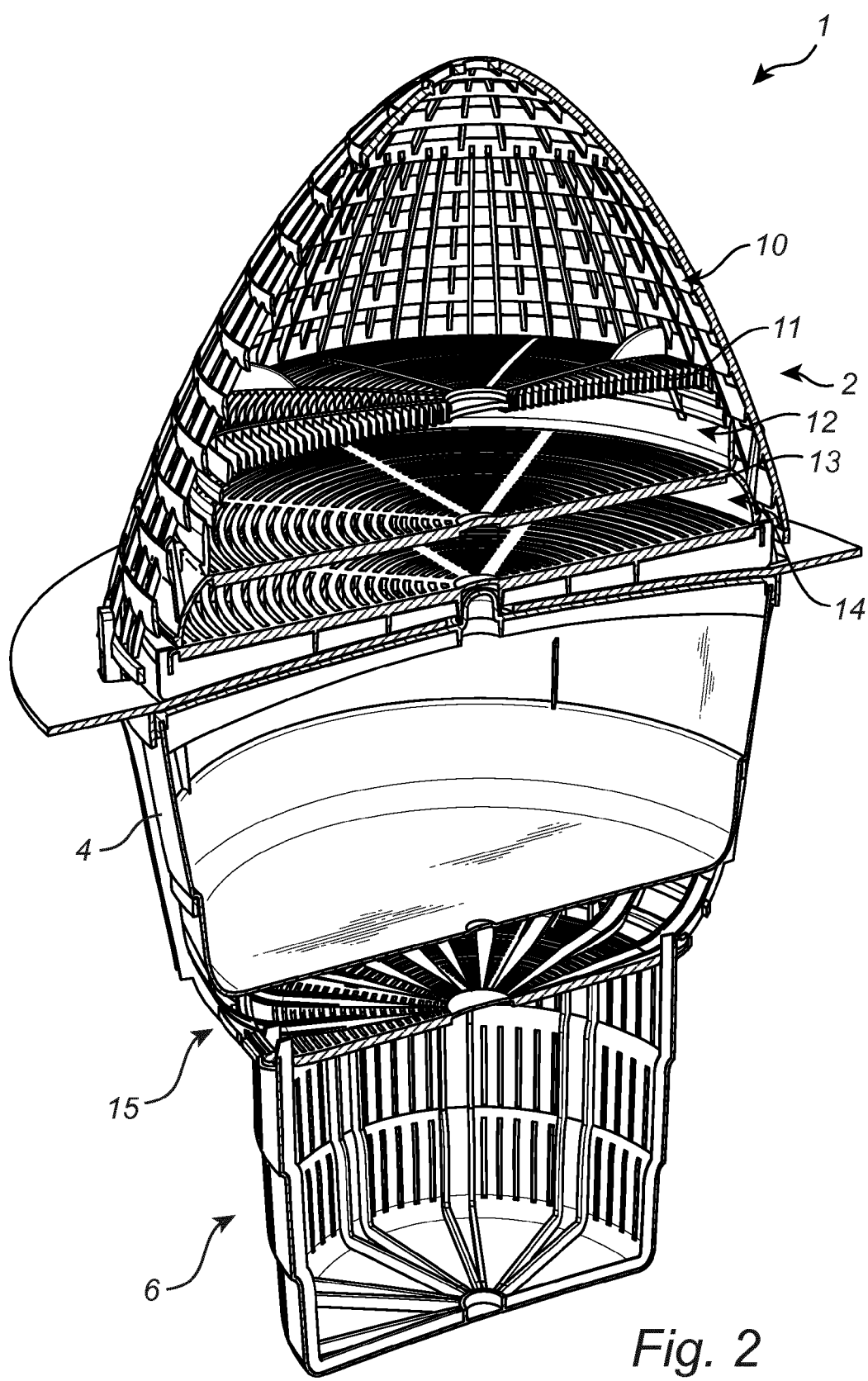
FIG. 2 illustrates a device for filtering stormwater according to an embodiment of the present invention.

FIG. 2 illustrates a cross-sectional view of a device according to an embodiment. The discussions above with reference to FIG. 1 is referred to with regard to FIG. 2. Filter unit 2 of the device 1 may be provided with a plurality of compartments 10, 12, 14, each compartment communicating with any above or below compartment 10, 12, 14 by being permeable to storm water, such as by comprising perforations. Typically, storm water flowing into the storm drain, will enter the filter unit 1 via compartment 10, in which it may be contacted with porous polypropylene comprised therein (not illustrated) such that contaminants may be removed from the storm water as the storm water flows or trickles downwards through compartment 10. The storm water may then enter compartment 12 via the perforated wall 11, which compartment 12 may hold, for example, activated carbon (not illustrated) which when contacted with the storm water may remove contaminants from the storm water when the storm water is passing through the compartment after which the storm water may enter compartment 14 of the filter unit 2 via perforated wall 13, which compartment 14 may hold, for example, slag from production of raw iron by means of a blast furnace, such as hyttsand, which when contacted with the storm water may remove metal from the storm water. From compartment 14, the storm water, now with lower concentrations of contaminants as compared to prior to having passed the filter unit 2, will be forwarded to the storm water of the storm drain.

Although the perforated walls 11 and 13 may be efficient means for providing compartments 10, 12, 14, it is realised that an embodiment may be efficient in absence of the walls 11 and 13 such as by the suitable provision of layers of, for example, porous polypropylene, activated carbon, and hyttsand. According to one embodiment, the compartments 10, 12, 14 are separated by means of perforated plastic sheets or layers.

From the above, it is realised that the device of embodiments filters storm water, for example, as larger particles present in the storm water, such as gravel, may be prevented from entering the device or may be trapped in the filter unit, as well as removes contaminants, which may be for example, compounds or molecules, by binding or capturing the compounds or molecules to material of the device 1.

According to an embodiment, a device, as illustrated in FIG. 2, may be provided with porous polypropylene in compartment 10, 1 kg of activated carbon in compartment 12, 1.5 kg of hyttsand in compartment 14, and 4.2 kg of hyttsand as solid material in the metal capturing ballast unit 6, wherein the floating carrier provides a lifting force corresponding to 8.5 kg.

The above exemplified device 1 and the disclosed embodiments thereof may by employed with sensors and communication capabilities, not shown. By employing the device with sensors, conditions of the device itself, such as the degree of saturation, may be monitored. Additionally, sensors may be provided at different locations in the storm drain for monitoring environmental conditions of the storm drain itself, such as the level of storm water in the storm drain or the amount of water entering the storm drain.

Moreover, the sensors provided on the device or in the storm drain may be remotely monitored by arranging the sensors in communication with communication units. Further, remote sensors not present in the storm drain may be monitored using the same communication units or additional communication units.

A system and a method for monitoring an environmental condition in a storm drain is disclosed in EP 2 620 562 A1. The device of the present invention may advantageously be used in the system and method disclosed in EP 2 620 562 A1.

Even though the invention has been described with reference to specific exemplifying embodiments thereof, many different alterations, modifications and the like will become apparent for those skilled in the art. Variations to the disclosed embodiments may be understood and effected by the skilled addressee in practicing the claimed invention, from a study of the drawings, the disclosure, and the appended claims. Furthermore, in the claims, the word "comprising" does not exclude other elements, and the indefinite article "a" or "an" does not exclude a plurality.

The invention claimed is:

1. A device for filtering storm water inside a storm drain, comprising:
    a storm water pervious filter unit arranged at least partially above the surface of the storm water,
    a storm water pervious metal capturing ballast unit arranged below the surface of the storm water,
    a floating carrier located between the overhead filter unit and the below ballast unit for supporting the filter unit and the metal capturing ballast unit in the storm water and enabling the device to float on the storm water so that storm water enters the pervious filter and the pervious ballast unit, and
    wherein the metal capturing ballast unit contains a solid material for capturing metal and providing ballast.

2. The device according to claim 1, wherein the solid material within the ballast unit comprises slag from production of raw iron by means of a blast furnace.

3. The device according to claim 2, wherein the solid material within the ballast unit is produced by cooling the slag by means of fresh water.

4. The device according to claim 1, wherein the solid material within the ballast unit is a solid granular material.

5. The device according to claim 1, wherein the filter unit contains a material selected from the group consisting of porous polypropylene, slag from production of raw iron, and activated carbon.

6. The device according to claim 1, wherein the metal capturing ballast unit further contains activated carbon.

7. The device according to claim 1, wherein the solid material contained in the ballast is capable of capture of metals selected from the group consisting of atomic metal, ionic metal, or compounds comprising metal.

8. The device according to claim 7, wherein the solid material contained in the ballast is capable of capture of a heavy metal.

9. The device according to claim 1, wherein the device further comprises a sheet of porous polypropylene extending radially outside the device at an elevation to cause the sheet to be at least partially arranged at the surface of the storm water.

10. The device according to claim 1, further comprising a compartment located below the surface of the storm water, wherein the compartment is provided with porous polypropylene.

11. The device according to claim 10, wherein the compartment is located below the floating carrier.

* * * * *